US012505940B2

(12) United States Patent
Sakuma et al.

(10) Patent No.: US 12,505,940 B2
(45) Date of Patent: Dec. 23, 2025

(54) RARE EARTH MAGNET AND MANUFACTURING METHOD THEREFOR

(71) Applicant: TOYOTA JIDOSHA KABUSHIKI KAISHA, Toyota (JP)

(72) Inventors: Noritsugu Sakuma, Mishima (JP); Tetsuya Shoji, Susono (JP); Akihito Kinoshita, Mishima (JP); Katsunori Danno, Obu (JP); Daisuke Ichigozaki, Toyota (JP); Masaaki Ito, Anjo (JP); Reimi Sakaguchi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 648 days.

(21) Appl. No.: 17/509,112

(22) Filed: Oct. 25, 2021

(65) Prior Publication Data

US 2022/0139601 A1 May 5, 2022

(30) Foreign Application Priority Data

Oct. 30, 2020 (JP) ................................ 2020-182534

(51) Int. Cl.
*H01F 1/057* (2006.01)
*B22F 3/24* (2006.01)
(Continued)

(52) U.S. Cl.
CPC ....... *H01F 1/0577* (2013.01); *H01F 41/0266* (2013.01)

(58) Field of Classification Search
None
See application file for complete search history.

(56) References Cited

U.S. PATENT DOCUMENTS

2005/0268989 A1* 12/2005 Tomizawa ............ C22C 38/002 148/105
2008/0223489 A1* 9/2008 Nagata ................ C22C 33/0278 148/303

(Continued)

FOREIGN PATENT DOCUMENTS

| | | | | |
|---|---|---|---|---|
| EP | 3522178 A1 * | 8/2019 | ............ | H01F 1/053 |
| JP | 2006210376 A * | 8/2006 | | |
| JP | 2020-027933 A | 2/2020 | | |

OTHER PUBLICATIONS

Fan, Acta Materialia. 154(2018)343-354. (Year: 2018).*
Machine translation of JP2006-210376A. (Year: 2006).*

*Primary Examiner* — Xiaowei Su
(74) *Attorney, Agent, or Firm* — Oliff PLC

(57) ABSTRACT

The present disclosure provides a rare earth magnet having a main phase and a grain boundary phase and a manufacturing method therefor. In the rare earth magnet of the present disclosure, the overall composition is represented by a formula $(R^1_{(1-x-y)}La_xCe_y)_u(Fe_{(1-z)}Co_z)_{(100-u-w-v)}B_wM^1_v$. ($R^1$ is a predetermined rare earth element, $M^1$ is a predetermined element, and the followings are satisfied, $0.05 \leq x \leq 0.25$, $0.5 \leq y/(x+y) \leq 0.50$, $13.5 \leq u \leq 20.0$, $0 \leq z \leq 0.100$, $5.0 \leq w \leq 10.0$, and $0 \leq v \leq 2.00$). The main phase has an $R_2Fe_{14}B$-type crystal structure, and the average grain size and the volume fraction of the main phase are respectively 1.0 μm to 20.0 μm and 80.0% to 90.0%. The main phase and the grain boundary phase satisfy, (the existence proportion of La in the grain boundary phase)/(the existence proportion of La in the main phase)>1.30.

7 Claims, 3 Drawing Sheets

(51) Int. Cl.
*B22F 9/04* (2006.01)
*H01F 41/02* (2006.01)

(56) References Cited

U.S. PATENT DOCUMENTS

2016/0293303 A1* 10/2016 Hirota ................. C22C 33/0278
2018/0182515 A1* 6/2018 Ito ........................... C22C 38/06

* cited by examiner

RARE EARTH MAGNET AND MANUFACTURING METHOD THEREFOR

CROSS-REFERENCE TO RELATED APPLICATION

This application claims priority to Japanese Patent Application No. 2020-182534 filed on Oct. 30, 2020, incorporated herein by reference in its entirety.

BACKGROUND

1. Technical Field

The present disclosure relates to a rare earth magnet and a manufacturing method therefor. The present disclosure particularly relates to an R—Fe—B-based rare earth magnet (where R is a rare earth element) and a manufacturing method therefor.

2. Description of Related Art

The R—Fe—B-based rare earth magnet has a main phase having an $R_2Fe_{14}B$-type crystal structure. High residual magnetization is obtained by this main phase.

Among the R—Fe—B-based rare earth magnets, the most general magnet having an excellent balance between performance and price is an Nd—Fe—B-based rare earth magnet (a neodymium rare earth magnet) in which Nd is selected as R. For this reason, the Nd—Fe—B-based rare earth magnet has been rapidly widespread, and it is expected that the amount of Nd to be used is increased sharply in the future. The amount of Nd to be used may exceed the reserve amount of Nd in the future. Accordingly, attempts have been made to substitute a part or all of the amount of Nd with light rare earth elements, such as Ce, La, Y, and Sc.

For example, Japanese Unexamined Patent Application Publication No. 2020-27933 (JP 2020-27933 A) discloses an R—Fe—B-based rare earth magnet in which a part of Nd's are substituted with La and Ce so that La and Ce have a predetermined molar ratio.

SUMMARY

In an R—Fe—B-based rare earth magnet, magnetic characteristics generally deteriorate in a case where a part of Nd's are substituted with a light rare earth element. In the R—Fe—B-based rare earth magnet disclosed in JP 2020-27933 A, La and Ce are selected as the light rare earth element, and the molar ratio therebetween is set within a predetermined range to suppress a decrease in coercive force at high temperature. On the other hand, the present inventors found that an R—Fe—B-based rare earth magnet in which a decrease in residual magnetization at room temperature is suppressed as much as possible is desired even in a case where a part of Nd's are substituted with a light rare earth element.

The present disclosure has been made to solve the above problems. An object of the present disclosure is to provide an R—Fe—B-based rare earth magnet, in which a decrease in residual magnetization at room temperature is suppressed as much as possible even in a case where a part of Nd's are substituted with a light rare earth element, and a manufacturing method therefor.

In order to achieve the above object, the present inventors have made extensive studies and have completed the rare earth magnet of the present disclosure and the manufacturing method therefor. The rare earth magnet and the manufacturing method therefor of the present disclosure include aspects below.

<1> A first aspect of the disclosure relates to a rare earth magnet including a main phase and a grain boundary phase present around the main phase.

In the rare earth magnet, an overall composition in terms of a molar ratio is represented by a formula $(R^1_{(1-x-y)}La_xCe_y)_u\ (Fe_{(1-z)}Co_z)_{(100-u-w-v)}B_wM^1_v$ (where $R^1$ is one or more elements selected from the group consisting of Nd, Pr, Gd, Tb, Dy, and Ho; $M^1$ is one or more elements selected from the group consisting of Ga, Al, Cu, Au, Ag, Zn, In, and Mn, and an unavoidable impurity element; and the followings are satisfied, $0.05 \leq x \leq 0.25,$ $0 \leq y/(x+y) \leq 0.50,$ $13.5 \leq u \leq 20.0,$ $0 \leq z \leq 0.100,$ $5.0 \leq w \leq 10.0,$ and $0 \leq v \leq 2.00).$ In the rare earth magnet, the main phase has a crystal structure of an $R_2Fe_{14}B$-type (where R is a rare earth element);

an average grain size of the main phase is 1.0 μm to 20.0 μm;

a volume fraction of the main phase is 80.0% to 90.0%; and the main phase and the grain boundary phase satisfy the following, (an existence proportion of La in the grain boundary phase)/(an existence proportion of La in the main phase)>1.30.

<2> In the rare earth magnet according to <1>, the $R^1$ may be one or more elements selected from the group consisting of Nd and Pr; and the $M^1$ may be one or more elements selected from the group consisting of Ga, Al, and Cu, and an unavoidable impurity element.

<3> In the rare earth magnet according to <1> or <2>, the volume fraction of the main phase may be 80.0% to 86.6%.

<4> In the rare earth magnet according to any one of <1> to <3>, the main phase and the grain boundary phase may satisfy the following, (the existence proportion of La in the grain boundary phase)/(the existence proportion of La in the main phase)≥1.56.

<5> Another aspect of the disclosure relates to the manufacturing method for the rare earth magnet according to <1>. The manufacturing method includes;

preparing a molten metal having a composition, in terms of a molar ratio, represented by a formula $(R^1_{(1-x-y)}La_xCe_y)_u(Fe_{(1-z)}Co_z)_{(100-u-w-v)}B_wM^1_v$ (where $R^1$ is one or more elements selected from the group consisting of Nd, Pr, Gd, Tb, Dy, and Ho; $M^1$ is one or more elements selected from the group consisting of Ga, Al, Cu, Au, Ag, Zn, In, and Mn, and an unavoidable impurity element; and the followings are satisfied, $0.05 \leq x \leq 0.25,$ $0 \leq y/(x+y) \leq 0.50,$ $13.5 \leq u \leq 20.0,$ $0 \leq z \leq 0.100,$ $$5.0 \le w \le 10.0, \text{ and}$$

$$0 \le v \le 2.00).$$

cooling the molten metal at a rate of 1° C./sec to $10^{4}$° C./sec to obtain a magnetic alloy;

pulverizing the magnetic alloy to obtain a magnetic powder; and sintering the magnetic powder without pressurisation to obtain a sintered body.

<6> In the manufacturing method according to <5>, the magnetic powder may be sintered without pressurization at 900° C. to 1,100° C.

<7> In the manufacturing method according to <5> or <6>, the sintered body alter the sintering without pressurization may be cooled at a rate of 1° C./min or less.

<8> In the manufacturing method according to any one of <5> to <7>, the $R^1$ may be one or more elements selected from the group consisting of Nd and Pr; and the $M^1$ may be one or more elements selected from the group consisting of Ga, Al, and Cu, and an unavoidable impurity element.

According to the present disclosure, in a case where the volume fraction of the main phase is set within a predetermined range, La in the main phase can be preferentially distributed to the grain boundary phase, and thus the existence proportion of La can be more increased in the grain boundary phase than in the main phase. In addition, instead of La that has been preferentially distributed from the main phase to the grain boundary phase, $R^1$ such as Nd in the grain boundary phase can be incorporated into the main phase, whereby a large amount of La that causes a decrease in residual magnetization can be made present in the grain boundary phase which has little effect on the residual magnetization. As a result, according to the present disclosure, it is possible to provide an R—Fe—B-based rare earth magnet, in which a decrease in residual magnetization at room temperature is suppressed as much as possible even in a case where a part of Nd's are substituted with a light rare earth element, and a manufacturing method therefor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the rare earth magnet and the manufacturing method therefor of the present disclosure will be described in detail. The embodiments described below do not limit the rare earth magnet and the manufacturing method therefor of the present disclosure.

Figure 1:
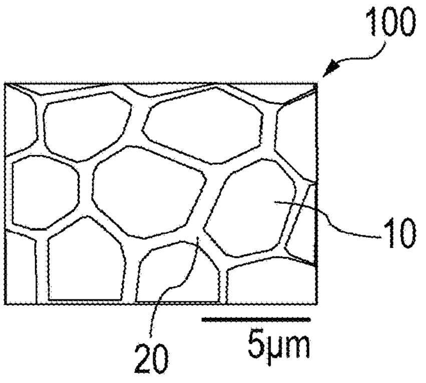
FIG. 1 is an illustrative view schematically illustrating a structure of a rare earth magnet of the present disclosure.
Figure 7:
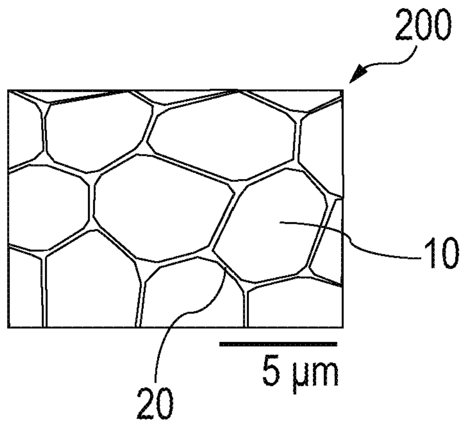
FIG. 7 is a view schematically illustrating a structure of a conventional rare earth magnet.

The findings, obtained by the present inventors, regarding the fact that the decrease in residual magnetization at room temperature can be suppressed as much as possible even in a case where a part of Nd's are substituted with a light rare earth element will be described with reference to the drawings. FIG. 1 is an illustrative view schematically illustrating a structure of a rare earth magnet of the present disclosure. FIG. 7 is a view schematically illustrating a structure of a conventional rare earth magnet.

In an R—Fe—B-based rare earth magnet, the generation of the α-Fe phase is suppressed by solidifying a molten metal containing a large amount of R as compared with the theoretical composition of $R_2Fe_{14}B$, whereby a phase having an $R_2Fe_{14}B$-type crystal structure can be stably obtained. In the theoretical composition of $R_2Fe_{14}B$, R is 11.8% by mole, Fe is 82.3% by mole, and B is 5.9% by mole. In the following description, a molten metal containing a large amount of R as compared with the theoretical composition of $R_2Fe_{14}B$ may be referred to as an "R-rich molten metal", and a phase having an $R_2Fe_{14}B$-type crystal structure may be referred to as an "$R_2Fe_{14}B$ phase".

In a case where the R-rich molten metal is solidified, as illustrated in FIG. 1 and FIG. 7, a structure having a main phase 10 and a grain boundary phase 20 present around the main phase 10 is obtained. The main phase 10 is the $R_2Fe_{14}B$ phase. Further, in the grain boundary phase 20, various phases having a higher existence proportion of R than the $R_2Fe_{14}B$ phase are mixed and integrated. For this reason, in general, such a phase in the grain boundary phase 20 is collectively referred to as an "R-rich phase".

In a case where R consists of rare earth elements $R^2$ and $R^3$, which are different from each other, and such R-rich molten metal is solidified to obtain the main phase 10 and grain boundary phase 20 illustrated in FIG. 1 and FIG. 7, $R^2$ and $R^3$ are basically evenly distributed to the main phase 10 and the grain boundary phase 20, respectively. For example, in a case where an R-rich molten metal in which the molar ratio of $R^2$ to $R^3$ is 0.70:0.30 is solidified, the molar ratio of $R^2$ to $R^3$ is basically 0.70:0.30 in both the main phase 10 and the grain boundary phase 20.

However, in a case where $R^2$ is a predetermined rare earth element other than La, such as Nd, and $R^3$ is La, a large amount of La is distributed to the grain boundary phase 20 as compared with the main phase 10 (hereinafter, this may be referred to as "preferential distribution of La to the grain boundary phase 20"). In response to the above, a large amount of a rare earth element other than La, such as Nd, is distributed to the main phase 10 as compared with the grain boundary phase 20 (hereinafter, this may be referred to as "preferential distribution of Nd or the like to the main phase 10).

As compared with the width of the grain boundary phase 20 of a conventional rare earth magnet 200 illustrated in FIG. 7, the width of the grain boundary phase 20 of a rare earth magnet 100 of the present disclosure illustrated in FIG. 1 is wide. This is because the volume fraction of the grain boundary phase 20 of the rare earth magnet 100 of the present disclosure is high as compared with the volume fraction of the grain boundary phase 20 of the conventional rare earth magnet 200. That is, the volume fraction of the main phase 10 of the rare earth magnet of the present disclosure is low as compared with the volume fraction of the main phase 10 of the conventional rare earth magnet 200. In a case where the volume fraction of the main phase 10 is low as in the rare earth magnet 100 of the present disclosure, the preferential distribution of La to the grain boundary phase 20 occurs easily. For example, a case of an R-rich molten metal in which $R^2$ is Nd, $R^3$ is La, and the molar ratio of $R^2$ (Nd) to $R^3$ (La) is 0.90:0.10 is solidified will be described as follows.

In the conventional rare earth magnet 200 illustrated in FIG. 7, for example, the molar ratio of $R^2$ (Nd) to $R^3$ (La) in the main phase is 0.90:0.10, and the molar ratio of $R^2$ (Nd) to $R^3$ (La) in the grain boundary phase 20 is 0.89:0.11. On the other hand, in the rare earth magnet 100 of the present disclosure illustrated in FIG. 1, for example, the molar ratio of $R^2$ (Nd) to $R^3$ (La) in the main phase is 0.92:0.08, and the molar ratio of $R^2$ (Nd) to $R^3$ (La) in the grain boundary phase 20 is 0.82:0.18. As described above, in the rare earth magnet 100 of the present disclosure, the preferential distribution of La to the grain boundary phase 20 occurs further remarkably as compared with the conventional rare earth magnet 200. In response to the above, in the rare earth magnet 100 of the present disclosure, the preferential distribution of Nd to the main phase occurs further remarkably.

In addition, the residual magnetization of the rare earth magnet can be calculated by Expression (1) below.

(Residual magnetization of rare earth magnet)=(saturation magnetization of main phase)×(volume fraction of main phase)×(alignment degree) Expression (1)

From Expression (1), it can be understood that in a case where the saturation magnetization of the main phase, the volume fraction of the main phase, and the alignment degree are improved, the residual magnetization of the rare earth magnet is improved. The alignment degree is an indicator indicating the degree of anisotropy in a case where the anisotropy is imparted to the rare earth magnet. The method of imparting anisotropy to a rare earth magnet, such as molding in the magnetic field, has been established, and the alignment degree is generally 94% to 98%. As a result, for improving the residual magnetization of the rare earth magnet, it is effective to improve the saturation magnetization of the main phase or the volume fraction of the main phase.

As described above, the main phase 10 is the $R_2Fe_{14}B$ phase. The saturation magnetization of the $R_2Fe_{14}B$ phase of the light rare earth element, such as the $Ce_2Fe_{14}B$ phase, is generally small as compared with the saturation magnetization of the $R_2Fe_{14}B$ phase other than the light rare earth element, such as the $Nd_2Fe_{14}B$ phase. Further, since the $La_2Fe_{14}B$ phase is very unstable, it is difficult to be present as the $La_2Fe_{14}B$ phase. However, for example, the $(Nd, La)_2Fe_{14}B$ phase obtained by substituting a part of Nd's in the $Nd_2Fe_{14}B$ phase with La is relatively stable in a case where the substitution rate of La is equal to or less than a predetermined value. However, in the $(Nd, La)_2Fe_{14}B$ phase, the saturation magnetization decreases by a degree equivalent to the amount of Nd that is substituted with La.

By the way, as compared with the width of the grain boundary phase 20 of the conventional rare earth magnet 200 (see FIG. 7), the width of the grain boundary phase 20 of the rare earth magnet 100 (see FIG. 1) of the present disclosure is wide. This is because the volume fraction of the grain boundary phase 20 in the rare earth magnet 100 of the present disclosure is higher than the volume fraction of the grain boundary phase 20 of the conventional rare earth magnet 200. That is, the volume fraction of the main phase 10 of the rare earth magnet 100 of the present disclosure is low as compared with the volume fraction of the main phase of the conventional rare earth magnet 200. As a result, since the residual magnetization is generated by the main phase 10, it is considered, from Expression (1), that the residual magnetization of the rare earth magnet 100 of the present disclosure is small as compared with the residual magnetization of the conventional rare earth magnet 200. However, as described above, in the conventional rare earth magnet 200 and the rare earth magnet 100 of the present disclosure, even in a case where the overall compositions of both are the same, the preferential distribution of La to the grain boundary phase 20 occurs, and in response to this, the preferential distribution of Nd or the like to the main phase 10 occurs in a case where $R^2$ is a rare earth element other than La, such as Nd, and $R^3$ is La. Then, the preferential distribution of La to the grain boundary phase 20 and the preferential distribution of Nd or the like to the main phase 10 occur remarkably in a case where the volume fraction of the main phase 10 is low. Therefore, the saturation magnetization of the main phase 10 of the rare earth magnet 100 of the present disclosure is high as compared with the saturation magnetization of the main phase 10 of the conventional rare earth magnet 200. From these facts, in a case where the volume fraction of the main phase 10 is within a predetermined range as in a case of the rare earth magnet 100 of the present disclosure, the existence proportion of La in the grain boundary phase 20 with respect to the existence proportion of La in the main phase 10 exceeds a predetermined value, and in response to this, the existence proportion of Nd or the like in the main phase 10 with respect to the existence proportion of Nd or the like in the grain boundary phase 20 exceeds a predetermined value. As a result, in the rare earth magnet 100 of the present disclosure, the improvement in residual magnetization, due to the fact that the existence proportion of Nd or the like to the main phase 10 becomes high by the preferential distribution of Nd or the like to the main phase 10, outweighs the decrease in residual magnetization, due to the fact that the volume fraction of the main phase 10 is decreased. This makes it is possible to provide an R—Fe—B-based rare earth magnet, in which a decrease in residual magnetization at room temperature is suppressed as much as possible even in a case where a part of Nd's are substituted with a light rare earth element.

Although the extent of the preferential distribution is moderate as compared with the preferential distribution of La to the grain boundary phase 20 and the accompanying preferential distribution of Nd or the like to the main phase 10, the preferential distribution of Ce to the grain boundary phase 20 and the accompanying preferential distribution of Nd or the like to the main phase 10 are also observed. Although not bound by theory, since the $La_2Fe_{14}B$ phase is very unstable and the $Ce_2Fe_{14}B$ phase is unstable as compared to the $Nd_2Fe_{14}B$ phase, it is conceived that La and Ce are more stable in a case of being present in the grain boundary phase 20 than in a case of being present in the main phase 10. As a result, it is conceived that the preferential distribution of La and Ce to the grain boundary phase 20 and the accompanying preferential distribution of Nd or the like to the main phase 10 occur.

Since the grain boundary phase 20 is the R-rich phase, in order to decrease the volume fraction of the main phase 10 (in order to increase the volume fraction of the grain boundary phase 20), it is effective to increase the total content proportion of rare earth elements in the entire rare earth magnet. Although not bound by theory, in a case where a part of Nd's are substituted with La, opportunities for the preferential distribution of La to the grain boundary phase 20 and the accompanying preferential distribution of Nd or the like to the main phase increase in a case where the total content proportion of rare earth elements is high in the entire rare earth magnet. Similarly, although not bound by theory, in a case where a part of Nd's are optionally substituted with Ce, opportunities for the preferential distribution of Ce to the grain boundary phase 20 and the accompanying preferential distribution of Nd or the like to the main phase increase in a case where the total content proportion of rare earth elements is high in the entire rare earth magnet. From these facts, it is preferable that the volume fraction of the main phase 10 is low (the volume fraction of the grain boundary phase 20 is high) as long as the volume fraction of the main phase 10 is not excessively low and the residual magnetization of the rare earth magnet is excessively decreased.

Further, although not bound by theory, it is conceived that the preferential distribution of La to the grain boundary phase 20 and the accompanying preferential distribution of Nd or the like to the main phase 10 occur at the time of manufacturing the magnetic powder or occur at the time of sintering the magnetic powder. The occurrence at the time of manufacturing the magnetic powder means the occurrence generated when the molten metal is cooled to form the main phase 10. The occurrence at the time of sintering the magnetic powder means the occurrence generated when La, Nd, and the like are mutually substituted between the main phase 10 and the grain boundary phase 20 after the formation of the main phase 10. In any case, it is conceived that time is needed for the preferential distribution of La to the grain boundary phase 20 and the accompanying preferential distribution of Nd or the like to the main phase 10. From this, it is conceived that the cooling rate of the molten metal and the cooling rate of the sintered body after the completion of sintering is preferably slow. The cooling rate of the molten metal is conceived to be such a cooling rate that the grain size of the main phase in the magnetic powder does not become coarse even in a case where the magnetic powder is sintered without pressurization. The cooling rate of the sintered body after the completion of sintering is conceived to be such a cooling rate that the cooling is not intentional cooling such as active air cooling.

As described above, in the rare earth magnet of the present disclosure, a large amount of La and Ce, which cause a decrease in the residual magnetization, is distributed to the grain boundary phase, and a large amount of Nd or the like, which contributes to the improvement of the residual magnetization, is distributed to the main phase. It will be described to what extent the decrease in residual magnetization is suppressed by the above fact even in a case where the amount of Nd or the like used is reduced in the rare earth magnet of the present disclosure.

In recent years, materials informatics has evolved rapidly. In a case where materials informatics is utilized, the saturation magnetization of the main phase can be predicted relatively accurately in a case where the composition (the molar ratio of each element constituting the main phase) of the main phase is determined. As described above, as long as rare earth elements such as La and Ce, which are preferentially distributed to the grain boundary phase, are not used, each rare earth element is evenly distributed to the main phase and the grain boundary phase.

The molar ratio of each element in the overall composition of the rare earth magnet is almost equal to the blending molar ratio of the raw material. For example, the overall composition of the rare earth magnets of the present disclosure is represented by a formula $(R^1_{(1-x-y)}La_xCe_y)_u(Fe_{(1-z)}Co_z)_{(100-u-w-v)}B_wM^1_v$. The molar ratio of each element in the overall composition represented by this formula is almost equal to the blending molar ratio of the raw material. Therefore, as long as La and Ce are not preferentially distributed as described above, it is possible to predict the saturation magnetization of the main phase of the rare earth magnet to be obtained at the step of blending the raw material. Then, it is possible to predict the residual magnetization of the rare earth magnet to be obtained, by using Expression (1) described above.

Figure 2:
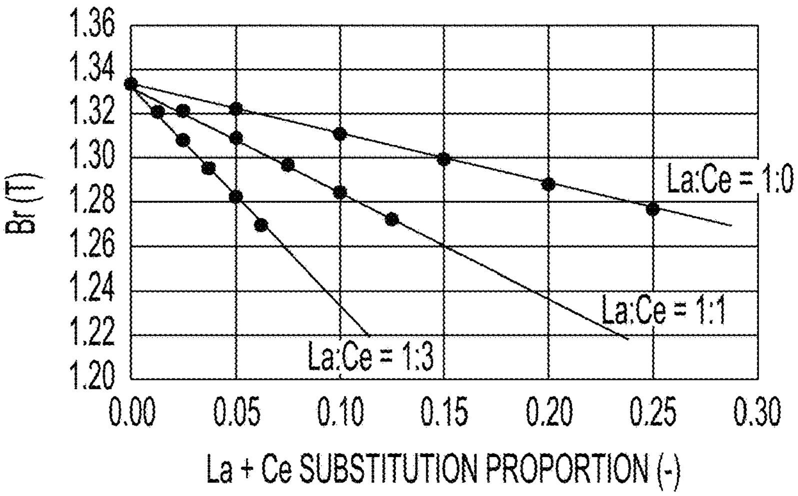
FIG. 2 is a graph showing an example of the residual magnetization predicted from the overall composition (the blending ratio of the raw material) of rare earth elements.

FIG. 2 is a graph showing an example of the residual magnetization expected from the overall composition (the blending ratio of the raw material) of rare earth elements. The graph of FIG. 2 is obtained by predicting the saturation magnetization of the main phase from the overall composition (the blending ratio of the raw material) of rare earth elements and converting it into residual magnetization using Expression (1) described above.

Figure 3:
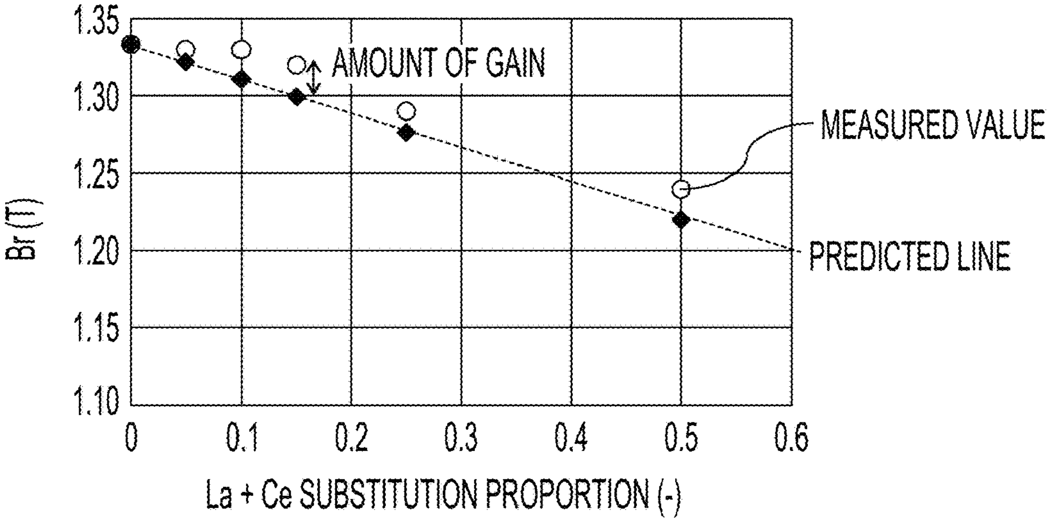
FIG. 3 is a graph showing a relationship between the measured residual magnetization and the predicted residual magnetization in a case where the molar ratio (La:Ce) of La to Ce is 1:0.

Since La and optionally Ce are used in the rare earth magnet of the present disclosure, the residual magnetization is improved as compared with the prediction result of FIG. 2. FIG. 3 is a graph showing a relationship between the measured residual magnetization and the predicted residual magnetization in a case where the molar ratio (La:Ce) of La to Ce is 1:0.

From FIG. 3, it can be understood that the measured residual magnetization is higher than the predicted residual magnetization. In the present specification, the difference between the measured residual magnetization and the predicted residual magnetization will be referred to as "gain". From FIG. 3, it can be understood that in a case where a part of Nd' or the like is substituted with light rare earth elements such as La and Ce to reduce the amount of Nd used, the decrease in residual magnetization can be suppressed by the amount of gain by preferentially distributing Nd and Ce as described above depending on the molar ratio of La to Ce or the like and the manufacturing conditions.

Based on these findings, the configuration requirements of the rare earth magnet of the present disclosure and the manufacturing method therefor will be described below.

Rare Earth Magnet

First, the configuration requirements of the rare earth magnet of the present disclosure will be described.

As illustrated in FIG. 1, the rare earth magnet 100 of the present disclosure includes the main phase 10 and the grain boundary phase 20. Hereinafter, the overall composition of the rare earth magnet 100 of the present disclosure, and the main phase 10 and the grain boundary phase 20 are described.

Overall Composition

The overall composition of the rare earth magnet 100 of the present disclosure will be described. The overall composition of the rare earth magnet 100 of the present disclosure means a composition in which all of the main phase 10 and the grain boundary phase 20 are combined.

The overall composition of the rare earth magnets of the present disclosure, in terms of molar ratio, is represented by a formula $(R^1_{(1-x-y)}La_xCe_y)_u(Fe_{(1-z)}Co_z)_{(100-u-w-v)}B_wM^1_v$. In this formula, the total of $R^1$, La, and Ce are u parts by mole, the total of Fe and Co is (100-u-w-v) parts by mole, B is w parts by mole, and $M^1$ is v parts by mole. Accordingly, the total of these is, u parts by mole+(100-u-w-v) parts by mole+w parts by mole+v parts by mole=100 parts by mole.

In the above formula, $R^1_{(1-x-y)}La_xCe_y$ means that $R^1$ of (1-x-y) is present, La of x is present, and Ce of y is present with respect to the total of $R^1$, La, and Ce in terms of molar ratio. Similarly, in the above formula, $Fe_{(1-z)}Co_z$ means that Fe of (1-z) is present and Co of z is present with respect to the total of Fe and Co in terms of molar ratio.

In the formula, $R^1$ is one or more elements selected from the group consisting of Nd, Pr, Gd, Tb, Dy, and Ho. Nd is neodymium, Pr is praseodymium, Gd is gadolinium, Tb is terbium, Dy is dysprosium, and Ho is holmium. Fe is iron. Co is cobalt. B is boron. $M^1$ is one or more elements selected from the group consisting of Ga, Al, Cu, Au, Ag, Zn, In, and Mn, and an unavoidable impurity element. Ga is gallium, Al is aluminum, Cu is copper, Au is gold Ag is silver, Zn is zinc, In is indium, and Mn is manganese.

In the present specification, unless otherwise specified, the rare earth elements consist of 17 elements of Sc, Y, La, Ce, Pr, Nd, Pm, Sm, Eu, Gd, Tb, Dy, Ho, Er, Tm, Yb, and Lu. Among these, Sc, Y, La, and Ce are light rare earth elements unless otherwise specified. Pr, Nd, Pm, Sm, and Eu are medium rare earth elements unless otherwise specified. Gd, Tb, Dy, Ho, Er, Tm, Yb, and Lu are heavy rare earth elements unless otherwise specified. In general, the rarity of heavy rare earth elements is high, and the rarity of light rare earth elements is low. The rarity of medium rare earth elements is between heavy rare earth elements and light rare earth elements. Sc is scandium, Y is ytterbium, La is lantern, Ce is cerium, Pr is praseodymium, Nd is neodymium, Pm is promethium, Sm is samarium, Eu is europium, Gd is gadolinium, Tb is terbium, and Dy is dysprosium. Ho is holmium, Er is erbium, Tm is thulium, Yb is ytterbium, and Lu is ruthenium.

The constituent elements of the rare earth magnet of the present disclosure, represented by the above formula, will be described below.

$R^1$ $R^1$ is the essential component for the rare earth magnet of the present disclosure. As described above, $R^1$ is one or more elements selected from the group consisting of Nd, Pr, Gd, Tb, Dy, and Ho. $R^1$ is a constituent element of the main phase (a phase (an $R_2Fe_{14}B$ phase) having the $R_2Fe_{14}B$-type crystal structure). From the viewpoint of the balance between the residual magnetization, the coercive force, and the price, $R^1$ is preferably one or more elements selected from the group consisting of Nd and Pr. As $R^1$, didymium may be used in a case where Nd and Pr are allowed to be present together.

La

La is the essential component in the rare earth magnet of the present disclosure. In a case where a part of $R^1$'s are substituted with La, the preferential distribution of La to the grain boundary phase occurs, and accompanying this, the preferential distribution of $R^1$ to the main phase occurs.

Ce

Ce is an optional component in the rare earth magnet of the present disclosure. In a case where a part of $R^1$'s are substituted with Ce, the preferential distribution of Ce to the grain boundary phase occurs, and accompanying this, the preferential distribution of $R^1$ to the main phase occurs.

Molar Ratio Between $R^1$, La, and Ce

As described above, in the rare earth magnet of the present disclosure, $R^1$, La, and Ce are present in a molar ratio of (1-x-y):x:y. This means that a part of $R^1$'s are substituted with Nd, and optionally a part of $R^1$'s are substituted with Ce due to (1-x-y)+x+y=1.

In the rare earth magnet of the present disclosure, as described above, La is preferentially distributed to the grain boundary phase, and accompanying this, $R^1$ is preferentially distributed to the main phase. In a case where x is 0.05 or more, the effect can be practically recognized. From this viewpoint, x may be 0.07 or more, 0.10 or more, or 0.12 or more. On the other hand, in a case where x is 0.25 or less, the main phase (the $R_2Fe_{14}B$ phase) does not become unstable. From this viewpoint, x may be 0.23 or less, 0.20 or less, or 0.15 or less.

In the rare earth magnet of the present disclosure, in a case where Ce is optionally contained, Ce is preferentially distributed to the grain boundary phase, and accompanying this, $R^1$ is preferentially distributed to the main phase. $R^1$ is preferentially distributed to the main phase according to the number of moles La and Ce which are preferentially decomposed in the grain boundary phase. As described above, the preferential distribution of La to the grain boundary phase is remarkable as compared with the preferential distribution of Ce to the grain boundary phase. In a case where the content proportion of La is increased, a larger amount of $R^1$ is preferentially distributed to the main phase, and as a result, the residual magnetization is further improved. From this viewpoint, y/(x+y), which indicates the proportion of the number of moles of Ce with respect to the total number of moles of La and Ce, may be 0 or more, 0.10 or more, or 0.20 or more, and may be 0.50 or less, 0.40 or less, or 0.30 or less. In addition, in a case where y/(x+y)=0, it means that Ce is substantially not contained.

Total Content Proportion of $R^1$, La, and Ce

In the above formula, the total content proportion of $R^1$, La, and Ce is represented by u and satisfies $13.5 \le u \le 20.0$. Here, the value of u is the content proportion with respect to the rare earth magnet of the present disclosure and corresponds to % by mole (% by atom).

In a case where u is 13.3 or more, not only a large amount of the α-Fe phase becomes present, but also the volume fraction of the grain boundary phase becomes high as compared with the conventional rare earth magnet (the volume fraction of the main phase is decreased), and thus the preferential distribution of La to the grain boundary phase and the accompanying preferential distribution of $R^1$ to the main phase are promoted. From this viewpoint, u may be 14.0 or more, 14.5 or more, 13.0 or more. 15.5 or more, or 16.0 or more. On the other hand, in a case where u is 20.0 or less, the grain boundary phase becomes excessive, and thus the residual magnetization does not decrease excessively. From this viewpoint, u may be 19.0 or less, 18.0 or less, or 17.0 or less.

B

B constitutes the main phase 10 ($R_2Fe_{14}B$ phase) of FIG. 1 and affects the existence proportion (the volume fraction) of the main phase 10 and the grain boundary phase 20.

The content proportion of B is represented by w in the above formula. The value of w is the content proportion with respect to the rare earth magnet of the present disclosure and corresponds to % by mole (% by atom). In a case where w is 10.0 or less, a rare earth magnet in which the main phase and the grain boundary phase are properly present can be obtained. From this viewpoint, w may be 9.0 or less, 8.0 or less, 7.0 or less, or 6.0 or less. On the other hand, in a case where w is 5.0 or more, the formation of the $R_2Fe_{14}B$ phase is rarely inhibited. From this viewpoint, w may be 5.1 or more, 5.2 or more, or 5.3 or more.

$M^1$ $M^1$ is an element that can be contained within a range that does not impair the characteristics of the rare earth magnet of the present disclosure. $M^1$ may contain an unavoidable impurity element. In the present specification, the unavoidable impurity element refers to an impurity element of which the inclusion is unavoidable or an impurity element which causes a significant increase in manufacturing cost for avoiding the inclusion thereof, for example, an impurity element included in the raw material of the rare earth magnet, an impurity element mixed in the manufacturing process, or the like. The impurity element mixed in the manufacturing process or the like includes an element included within a range that does not affect the magnetic characteristics due to manufacturing reasons. In addition, the unavoidable impurity element includes a rare earth element other than the rare earth elements selected as $R^1$, La, and Ce, which is unavoidably mixed for the reasons described above.

Examples of the element $M^1$ that can be included within the range that does not impair the effects of the rare earth magnet and the manufacturing method therefor of the present disclosure include one or more elements selected from the group consisting of Ga, Al, Cu, Au, Ag, Zn, in, and Mn. As long as these elements are present below the upper limit of the $M^1$ content, these elements have substantially no effect on the magnetic characteristics. Therefore, these elements may be treated in the same manner as the unavoidable impurity element. In addition to these elements, $M^1$ may include an unavoidable impurity element. $M^1$ is preferably one or more selected from the group consisting of Ga, Al, and Cu, and an unavoidable impurity element.

In the above formula, the content proportion of $M^1$ is represented by v. The value of v is the content proportion with respect to the rare earth magnet of the present disclosure and corresponds to % by mole (% by atom). In a case where the value of v is 2.00 or less, the magnetic characteristics of the rare earth magnet of the present disclosure are not impaired. From this viewpoint, v may be 1.70 or less, 1.60 or less, 1.55 or less, 1.56 or less, 1.00 or less, 0.65 or less, 0.60 or less, or 0.50 or less.

In regard to $M^1$, since Ga, Al, Cu, Au, Ag. Zn, In, and Mn and the unavoidable impurity element cannot be eliminated perfectly, there is no problem in practical use even in a case where the lower limit of v is 0.05, 0.10, 0.20, 0.30, or 0.40.

Fe

Fe is a main component constituting the main phase (the $R_2Fe_{14}B$ phase) together with $R^1$, La, Ce, and B, and Co described later. A part of Fe may be substituted with Co.

Co

Co is an element that can be substituted with Fe in the main phase and the grain boundary phase. In the present specification, in a case where Fe is described, this description means that a part of Fe's can be substituted with Co. For example, a part of Fe's in the $R_2Fe_{14}B$ phase are substituted with Co to become an $R_2(Fe,Co)_{14}B$ phase.

In a case where a part of Fe's are substituted with Co, thereby the $R_2Fe_{14}B$ phase becoming the $R_2(Fe,Co)_{14}B$ phase, the corrosion resistance and the Curie temperature of the rare earth magnet of the present disclosure increases. In a case where the increase in the corrosion resistance and the Curie temperature is not desired, Co may not be included, and the inclusion of Co is not essential.

Molar Ratio of Fe to Co

Even in a case where the rare earth magnet of the present disclosure contains Co, the content thereof is small, and thus the corrosion resistance is mainly improved. In a case where even a small amount of Co is contained, the improvement in corrosion resistance is recognized, and the improvement in corrosion resistance is clearly recognized in a case where z is 0.010 or more, 0.012 or more, or 0.014 or more. On the other hand, since Co is expensive, from the economic viewpoint, z may be 0.100 or less, 0.080 or Less, 0.060 or less, 0.040 or less, or 0.020 or less.

Total Content Proportion of Fe and Co

Fe and Co are the residue that remains after excluding $R^1$, La, Ce, B, and $M^1$ described above, and the total content proportion thereof is represented by (100-u-w-v). As described above, since the values of u, w, and v are the content proportions with respect to the rare earth magnet of the present disclosure, (100-u-w-v) corresponds to % by mole (% in by atom). In a case where u, w, and v are adjusted in the range described above, the main phase 10 and the grain boundary phase 20 as illustrated in FIG. 1 are obtained.

As illustrated in FIG. 1, the rare earth magnet 100 of the present disclosure includes the main phase 10 and the grain boundary phase 20. Hereinafter, the main phase 10 and the grain boundary phase 20 will be described.

Main Phase

The main phase has a crystal structure of an $R_2Fe_{14}B$-type. R is a rare earth element. The reason why the description of the $R_2Fe_{14}B$ "type" is used is that an element other than R, Fe, and B can be included in the main phase (in the crystal structure) as a substitution type and/or an intrusion type. For example, in the rare earth magnet of the present disclosure, a part of Fe's are substituted with Co in the main phase. Co may be present in the main phase as the intrusion type. In addition, in the rare earth magnet of the present disclosure, a part of any element of R, Fe, Co. and B may be further substituted with $M^1$ in the main phase. Alternatively, for example, $M^1$ may be present in the main phase as an intrusion type. Hereinafter, the average grain size of the main phase and the volume fraction of the main phase will be described.

Average Grain Size of Main Phase

The average grain size of the main phase of the rare earth magnet of the present disclosure is 1.0 μm to 20.0 μm. The rare earth magnet of the present disclosure is obtained by sintering without pressurization. In a case where the average grain size of the main phase is 1.0 μm or more, the coarsening of the main phase can be suppressed at the time of sintering without pressurization. In addition, in a case where the molten metal is cooled at a rate such that the average grain size of the main phase becomes 1.0 μm or more at the time of manufacturing the magnetic powder, it can be expected to secure the time required for the preferential distribution of La to the grain boundary phase and the accompanying preferential distribution of Nd or the like to the main phase at the time of generating the main phase. From these viewpoints, the average grain size of the main phase may be 2.0 μm or more, 3.0 μm or more, 4.0 μm or more, 5.0 μm or more, 5.5 μm or more, or 6.0 μm or more. On the other hand, in a case where the average grain size of the main phase is 20.0 μm or less, it is possible to suppress a decrease in residual magnetization and coercive force. From this viewpoint, the average grain size of the main phase may be 15.0 μm or less, 10.0 μm or less, 8.0 μm or less, 7.7 μm or less, 7.5 μm or less, 7.0 μm or less, 6.5 μm or less, or 6.2 μm or less.

The "average grain size" is measured as follows. In a scanning electron microscope image or a transmission electron microscope image, a certain region observed in the direction perpendicular to the easy-magnetization axis is defined, and a plurality of lines is drawn in the direction perpendicular to the easy-magnetization axis with respect to the main phase present in this certain region, and the size (length) of the main phase is calculated from the distance between the points intersecting in the grain of the main phase (cutting method). In a case where the cross section of the main phase is close to a circle, the distance is converted to the equivalent projected area circle diameter. In a case where the cross section of the main phase is close to a rectangle, the distance is converted by a rectangular parallelepiped approximation. The values of $D_{50}$ of the distribution (the grain size distribution) of sizes (lengths) obtained in this manner is the average grain size.

Volume Fraction of Main Phase

The volume fraction of the main phase of the rare earth magnet of the present disclosure is 80.0% to 90.0%. In a case where the volume fraction of the main phase is low, the preferential distribution of $R^1$ to the main phase, which is accompanied by the preferential distribution of La and Ce to the grain boundary phase, is promoted, and thus the saturation magnetization of the main phase is improved. However, the amount of the main phase that contributes to the exhibition of magnetization decreases. On the other hand, in a case where the volume fraction of the main phase is high, the preferential distribution of $R^1$ to the main phase, which is accompanied by the preferential distribution of La and Ce to the grain boundary phase, is hardly improved, and thus the saturation magnetization of the main phase hardly occurs. However, the amount of the main phase that contributes to the exhibition of magnetization increases. From these facts, in a case where the volume fraction of the main phase is 80.0 or more, the improvement in residual magnetization, due to the fact that the existence proportion of $R^1$ in the main phase becomes high by the preferential distribution of $R^1$ to the main phase, which is accompanied by the preferential distribution of La and Ce to the grain boundary phase, outweighs the decrease in residual magnetization, due to the fact that the volume fraction of the main phase is decreased. From this viewpoint, the volume fraction of the main phase may be 81.0% or more, 82.0% or more, or 83.0% or more. On the other hand, in a case where the volume fraction of the main phase is 90.0% or less, the preferential distribution of La and Ce to the grain boundary phase and the preferential distribution of $R^1$ to the main phase are promoted. From this viewpoint, the volume fraction of the main phase may be 89.0% or less, 88.0% or less, 87.0% or less, or 86.6% or less.

For the volume fraction of the main phase, the overall composition of the rare earth magnet is measured using a high frequency inductively coupled plasma emission spectroscopy (an inductively coupled plasma atomic emission spectroscopy (ICP-AES)). From the measured value, the volume fraction of the main phase is calculated on the assumption that the phase of the rare earth magnet is divided into the main phase (the $R_2Fe_{14}B$ phase) and the R-rich phase.

Grain Boundary Phase

As illustrated in FIG. 1, the rare earth magnet 100 of the present disclosure includes the main phase 10 and the grain boundary phase 20 present around the main phase 10. As described above, the main phase 10 includes a magnetic phase ($R_2Fe_{14}B$ phase) having the crystal structure of an $R_2Fe_{14}B$-type. On the other hand, the grain boundary phase 20 includes a phase of which the crystal structure is unclear as well as a phase having a crystal structure other than the $R_2Fe_{14}B$-type. Although not bound by theory, the "phase of which the structure is unclear" means a phase (state) in which at least a part of the phase has incomplete crystal structures, which are present irregularly. In both cases of a phase having a crystal structure other than the $R_2Fe_{14}B$-type and a phase in which the crystal structure is not clear, the existence proportion of R is high in the phase that is present in the grain boundary phase 20 as compared with a phase having the $R_2Fe_{14}B$-type crystal structure. For this reason, the grain boundary phase 20 is sometimes referred to as the "R-rich phase" as described above.

(Existence Proportion of La to Grain Boundary Phase)/(Existence Proportion of La to Main Phase)

In the rare earth magnet of the present disclosure, La is preferentially distributed to the grain boundary phase, and accompanying this, $R^1$ is preferentially distributed to the main phase. The degree to which La is preferentially distributed to the grain boundary phase can be evaluated by (the existence proportion of La in the grain boundary phase)/(the existence proportion of La in the main phase). The existence proportion of La in the grain boundary phase is the ratio of the number of moles of La in the grain boundary phase with respect to the number of moles of all rare earth elements in the grain boundary phase. The existence proportion of La in the main phase is the ratio of the number of moles of La in the main phase with respect to the number of moles of all rare earth elements in the main phase. The number of moles of each element including La in the main phase and the brain boundary phase can be determined by the analysis using a scanning electron microscope/energy dispersive X-ray (SEM-EDX).

In a case where (the existence proportion of La in the grain boundary phase)/(the existence proportion of La in the main phase) is more than 1.30, the improvement in residual magnetization, due to the fact that the existence proportion of $R^1$ in the main phase becomes high by the preferential distribution of $R^1$ to the main phase, which is accompanied by the preferential distribution of La to the grain boundary phase, outweighs the decrease in residual magnetization, due to the fact that the volume fraction of the main phase is decreased. From this viewpoint, (the existence proportion of La in the grain boundary phase)/(the existence proportion of La in the main phase) may be 1.33 or more, 1.50 or more, 1.55 or more, 1.56 or more, 1.60 or more, 1.70 or more, 1.75 or more, 1.80 or more, or 2.00 or more. The upper limit of (the existence proportion of La in the grain boundary phase)/(the existence proportion of La in the main phase) is not particularly limited; however, the upper limit is roughly 3.00 to 4.00.

Even in the preferential distribution of $R^1$ to the main phase, which is accompanied by the preferential distribution of Ce to the grain boundary phase, the existence proportion of $R^1$ to the main phase increases, which contributes to the improvement of residual magnetization. Since the preferential distribution of $R^1$ to the main phase, which is accompanied by the preferential distribution of La to the grain boundary phase, is sufficiently large as compared with the preferential distribution of $R^1$ to the main phase, which is accompanied by the preferential distribution of Ce to the grain boundary phase, (the existence proportion of La in the grain boundary phase)/(the existence proportion of La in the main phase) may be used representatively.

Manufacturing Method

Next, a manufacturing method for a rare earth magnet of the present disclosure will be described.

The manufacturing method for a rare earth magnet of the present disclosure includes each process of molten metal preparation, molten metal cooling, pulverization, and sintering without pressurization. Each of these processes will be described below.

Preparation of Molten Metal

A molten metal having a composition, in terms of molar ratio, represented by a formula $(R^1_{(1-x-y)}La_xCe_y)_u(Fe_{(1-z)}Co_z)_{(100-u-w-v)}B_wM^1_v$ is prepared. In this formula, $R^1$, La, Ce, Fe, Co, B, $M^1$, and x, y, z, u, w, and v are as described in "<<Rare earth magnet>>". For an element that may be depleted in the subsequent process, the amount of the element to be depleted may be taken into account.

Cooling of Molten Metal

The molten metal having the above composition is cooled at a rate of 1° C./sec to×$10^{4}$° C./sec. In a case where the molten metal is cooled at such a rate, a magnetic alloy having a main phase having an average grain size of 1 μm to 20 μm can be obtained. From the viewpoint of obtaining the main phase having an average grain size of 1 μm or more, the molten metal may be cooled at a rate of 5×$10^{3}$° C./sec or less, $10^{3}$° C./sec or less, or 5° C.×$10^{2}$° C./sec or less. On the other hand, from the viewpoint of obtaining the main phase having an average grain size of 20 μm or less, the molten metal may be cooled at a rate of 5° C./sec or more, 10° C./sec or more, or $10^{2}$° C./sec or more. The main phase is a phase having an $R_2Fe_{14}B$-type crystal structure, and the grain boundary phase is present around the main phase. Then, in a case where the molten metal is cooled at a rate in the above range, it is expected that La and Ce are preferentially distributed to the gain boundary phase during manufacturing the magnetic alloy, that is, when the main phase (the $R_2Fe_{14}B$ phase) is formed. From the viewpoint of the preferential distribution of La and Ce to the grain boundary phase, the cooling rate of the molten metal is preferably 5×$10^{3}$° C./sec or less, more preferably $10^{3}$° C./sec or less, and still more preferably 5° C.×$10^{2}$° C./sec or less.

The method is not particularly limited as long as the molten metal can be cooled at the above-described rate; however, typical examples thereof include an arc melting method, a method using a book mold, and a strip casting method. A strip casting method is preferable from the viewpoint that the above-described rate can be stably obtained and a large amount of molten metal can be continuously cooled. From the viewpoint of further promoting the preferential distribution of La and Ce to the grain boundary phase, an arc melting method is preferable.

In the arc melting method, a raw material is charged into a container, typically a crucible, and the raw material is arc-melted in the container or the crucible to obtain a molten metal. Then, the arc discharge is stopped and the molten metal is cooled in the container or the crucible to obtain an ingot-shaped magnetic alloy.

The book mold is a casting mold having a flat plate-shaped cavity. The thickness of the cavity may be appropriately determined so that the above-described cooling rate can be obtained. The thickness of the cavity may be, for example, 0.5 mm or more, 1 mm or more, 2 mm or more, 3 mm or more, 4 mm or more, or 5 mm or more, and may be 20 mm or less, 15 mm or less, 10 mm or less, 9 mm or less, 8 mm or less, 7 mm or less, or 6 mm or less.

Figure 4:
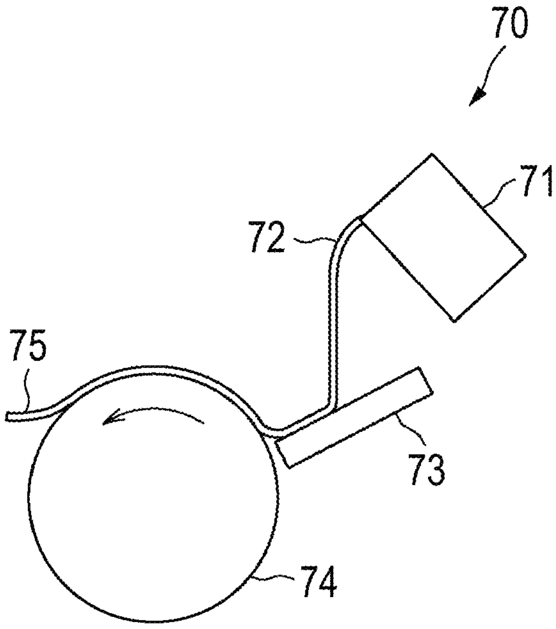
FIG. 4 is an illustrative view schematically illustrating a cooling device that is used in the strip casting method.

Next, the strip casting method will be described with reference to the drawing FIG. 4 is an illustrative view schematically illustrating a cooling device that is used in the strip casting method.

A cooling device 70 includes a melting furnace 71, a tundish 73, and a cooling roll 74. A raw material is melted in the melting furnace 71, and a molten metal 72 having the above composition is prepared. A predetermined supply amount of the molten metal 72 is supplied to the tundish 73. The molten metal 72 supplied to the tundish 73 is supplied to the cooling roll 74 from the end part of the tundish 73 by its own weight.

The tundish 73 is made of ceramics or the like, temporarily store the molten metal 72 continuously supplied from the melting furnace 71 at a predetermined flow rate, and can rectify the flow of the molten metal 72 to the cooling roll 74. The tundish 73 also has a function of adjusting the temperature of the molten metal 72 immediately before reaching the cooling roll 74.

The cooling roll 74 is formed of a material having high thermal conductivity such as copper or chromium, and the surface of the cooling roll 74 is plated with chromium or the like in order to reduce erosion with the molten metal at a high temperature. The cooling roll 74 can be rotated in the arrow direction at a predetermined rotation speed by a drive device not illustrated in the drawing.

In order to obtain the above-described cooling rate, the peripheral speed of the cooling roll 74 may be 0.5 m/s or more, 1.0 m/s or more, or 1.5 m/s or more, and may be 5.0 m/s or less, 4.5 m/s or less, 4.0 m/s or less, 3.5 m/s or less, 3.0 m/s or less, 2.5 m/s or less, or 2.0 m/s or less.

The temperature of the molten metal at the time of being supplied from the end part of the tundish 73 to the cooling roll 74 may be 1,350° C. or higher, 1,400° C. or higher, or 1,450° C. or higher, and may be 1.600° C. or lower, 1,550° C. or lower, or 1,500° C. or lower.

The molten metal 72 cooled and solidified on the outer periphery of the cooling roll 74 becomes a magnetic alloy 75, is peeled from the cooling roll 74, and is recovered by a recovery device (not illustrated in the drawing). The form of the magnetic alloy 75 is typically a thin ribbon form or a flake form.

In any of the molten metal cooling methods, in order to prevent oxidation of the molten metal or the like, it is preferable to melt the raw material and to cool the molten metal, in an inert gas atmosphere. The inert gas atmosphere includes a nitrogen gas atmosphere.

Pulverization

The magnetic alloy obtained as described above is pulverized to obtain a magnetic powder. The pulverization method is not particularly limited; however, examples thereof include a method of coarsely pulverizing a magnetic alloy and then further pulverizing it with a jet mill and/or a cutter mill or the like. Examples of the coarse pulverization method include a method of using a hammer mill and a method of hydrogen-embrittling and pulverizing a magnetic alloy. These methods may be combined.

The grain size of the magnetic powder after the pulverization is not particularly limited as long as the magnetic powder can be sintered; however, it is preferable that one main phase is present in one grain of the magnetic powder. The grain size of the magnetic powder may be, for example, 1 μm or more, 5 μm or more, or 10 μm or more, and may be 3,000 μm or less, 2,000 μm or less, 1,000 μm or less, 900 μm or less, 800 μm or less, 700 μm or less, 600 μm or less, 500 μm or less, 400 μm or less, 300 μm or less, 200 μm or less, 100 μm or less, 50 μm or less, 40 μm or less, 30 μm or less, 20 μm or less, or 15 μm or less, in terms of $D_{50}$. In order to make one main phase present in one grain of the magnetic powder, it is preferable that the grain size of the magnetic powder is, for example, 1 μm or more, 5 μm or more, or 10 μm or more, and is 20 μm or less, 15 μm or less, or 12 μm or less, in terms of $D_{50}$. This makes the sinterability be improved.

Homogenization Heat Treatment

Optionally, the ingot may be heat treated (hereinafter, such heat treatment may be referred to as the "homogenization heat treatment") in order to homogenize the magnetic alloy before pulverization. As a result, the composition of individual grains of the magnetic powder after pulverizing the magnetic alloy becomes substantially uniform.

The temperature of the homogenization heat treatment may be, for example, 1,000° C. or higher, 1,050° C. or higher, or 1,100° C. or higher, and may be 1,300° C. or lower, 1,250° C. or lower, 1,200° C. or lower, or 1,150° C. or lower. The homogenization heat treatment time may be, for example, 6 hours or more, 12 hours or more, 18 hours or more, or 24 hours or more, and may be 48 hours or less, 42 hours or less, 36 hours or less, or 30 hours or less.

In order to suppress the oxidation of the magnetic alloy, the homogenization heat treatment is preferably performed in an inert gas atmosphere. The inert gas atmosphere includes a nitrogen gas atmosphere.

Sintering without Pressurization

The magnetic powder is sintered without pressurization to obtain a sintered body. As compared with sintering with pressurization, in the sintering without pressurization, the magnetic powder is sintered at a high temperature for a long time in order to increase the density of the sintered body without applying a pressurization force.

The sintering temperature may be, for example, 900° C. or higher, 950° C. or higher, 1,000° C. or higher, 1,020° C. or higher, 1,030° C. or higher, 1,040° C. or higher, 1,050° C. or higher, 1,060° C. or higher, or 1,070° C. or higher, and may be 1,100° C. or lower, 1,091° C. or lower, or 1,080° C. or lower. The sintering time may be, for example, 1 hour or more, 2 hours or more, 3 hours or more, or 4 hours or more, and may be 24 hours or less, 18 hours or less, 12 hours or less, or 6 hours or less. For suppressing the oxidation of the magnetic powder during sintering, the sintering atmosphere is preferably an inert gas atmosphere. The inert gas atmosphere includes a nitrogen gas atmosphere.

In order to promote the preferential distribution of La and Ce to the grain boundary phase and, accompanying this, the preferential distribution of $R^1$ to the main phase, it is preferable that not only the grain boundary phase but also the vicinity of the surface of the main phase also becomes a liquid phase during sintering without pressurization. For this reason, the sintering temperature is preferably 1,040° C. or higher, 1,050° C. or higher, 1,060° C. or higher, or 1,070° C. or higher, and may be 1,100° C. or lower, 1,090° C. or lower, or 1,080° C. or lower.

In order to promote the preferential distribution of La and Ce to the grain boundary phase and, accompanying this, the preferential distribution of $R^1$ to the main phase, It is preferable that the part that has become a liquid phase is slowly cooled. For this reason, the sintered body after sintering without pressurization is preferably cooled at 1° C./min or less, 0.5° C./min or less, 0.1° C./min or less, 0.05° C./min or less, or 0.01° C./min or less. The lower limit of the cooling rate of the sintered body after sintering without pressurization is not particularly limited: however, from the viewpoint of productivity, the lower limit of the cooling rate is roughly 0.001° C.: min to 0.005° C./min.

Powder Compacting in Magnetic Field

In order to improve the density of the sintered body, the magnetic powder may be optionally powder-compacted in advance before sintering, and then the compacted powder body may be sintered. The molding pressure at the time of powder compacting may be, for example, 50 MPa or more, 100 MPa or more, 200 MPa or more, or 300 MPa or more, and may be 1,000 MPa or less, 800 MPa or less, or 600 MPa or less. In order to impart anisotropy to the sintered body, the magnetic powder may be powder-compacted while a magnetic field is applied thereto. The magnetic field to be applied may be 0.1 T or more, 0.5 T or more, 1.0 T or more, 1.5 T or more, or 2.0 T or more and may be 10.0 T or less, 8.0 T or less, 6.0 T or less, or 4.0 T or less.

Heat Treatment

The sintered body may be optionally heat-treated under predetermined conditions (hereinafter, such heat treatment may be referred to as the "specific heat treatment"). The coercive force, particularly the coercive force at a high temperature, can be improved by making the contact surface between the main phase and the grain boundary phase a facet interface with the specific heat treatment.

As the conditions for the specific heat treatment, for example, the sintered body is held at 850° C. to 1.000° C. for 50 to 300 minutes and then cooled to 450° C. to 700° C. at a rate of 0.1° C./min to 5.0° C./min. As the specific heat treatment, after the above-described heat treatment, the sintered body may be further held at 450° C. to 650° C. for 30 to 180 minutes and cooled to room temperature at a rate of 10° C./min to 2,000° C./min. That is, the heat treatment may be performed in two steps.

For suppressing the oxidation of the sintered body during the specific heat treatment, the atmosphere of the specific heat treatment is preferably an inert gas atmosphere. The inert gas atmosphere includes a nitrogen gas atmosphere.

Modification

In addition to what has been described above, the rare earth magnet and the manufacturing method therefor of the present disclosure can be modified in various ways within the scope of the contents described in "Claims". For example, in a case where the rare earth magnet of the present disclosure is used as a precursor, and a modifying material is diffused and permeated into the precursor, the coercive force can be improved. As the method for diffusing and permeating a modifying material, a well-known method can be adopted.

Examples of the method for diffusing and permeating a modifying material include a vapor phase method in which a precursor is exposed in a gas atmosphere of a predetermined rare earth element such as Nd, a solid phase method in which a fluoride of a predetermined rare earth element such as Nd is brought into contact with a precursor and heated, and a liquid phase method in which a melt of a low melting point alloy of a predetermined rare earth element such as Nd and a transition metal such as Cu is brought into contact with a precursor. These methods may be combined. Typical examples of the rare earth element such as Nd include one or more elements selected from the group consisting of Nd, Pr, Gd, Tb, Dy, and Ho. Typical examples of the transition metal element such as Cu include one or more elements selected from Cu, Al, Co, and Fe.

The composition of the above-described low melting point alloy is represented by, for example, a formula $R'_{(1-\nu)}M'_{\nu}$ (where s is 0.05 to 0.40) in terms of molar ratio. R' may be, for example, a rare earth element such as Nd described above. M' may be, for example, a transition metal element such as Cu described above, and M' may contain unavoidable impurities. The unavoidable impurity element refers to an impurity element of which the inclusion is unavoidable or an impurity element which causes a significant increase in manufacturing cost for avoiding the inclusion thereof, for example, an impurity element included in the raw material and an impurity element mixed in the manufacturing process, or the like. The impurity element mixed in the manufacturing process or the like includes an element included within a range that does not affect the magnetic characteristics due to manufacturing reasons. In addition, the unavoidable impurity element includes a rare earth element other than the rare earth elements selected as R', which is unavoidably mixed for the reasons described above.

In a case where the rare earth magnet of the present disclosure is used as a precursor, and a modifying material having a composition represented by the above-described formula $R'_{(1-s)}M'_s$ in terms of molar ratio is diffused and permeated into the precursor, the overall composition of resultant rare earth magnet can be represented by a formula $(R^1_{(1-x-y)}La_xCe_y)_u(Fe_{(1-z)}Co_z)_{(100-u-w-v)}B_wM^1_vR'_{(1-s)}M'_s$ in terms of molar ratio.

Hereinafter, the rare earth magnet and the manufacturing method therefor of the present disclosure will be described in more detail with reference to Examples and Comparative Examples. The rare earth magnet and the manufacturing method therefor of the present disclosure are not limited to the conditions used in Examples below.

Preparation of Sample

Samples of Examples 1 to 6 and Comparative Examples 1 to 5 were prepared by the following procedure.

Raw materials were arc-melted and solidified so that the compositions shown in Table 1 were obtained, whereby magnetic alloys were obtained. The cooling rate of the molten metal was 50° C./sec. The magnetic alloy was subjected to homogenization heat treatment at 1,100° C. for 24 hours.

The magnetic alloy after the homogenization heat treatment was pulverized by the method shown in Table 1 to obtain a magnetic powder. Then, the magnetic powder was powder-compacted in a magnetic field of 1.0 T to obtain a compacted powder body. The pressure at the time of the powder compacting was 100 MPa.

The compacted powder body was sintered without pressurization under the conditions shown in Table 1. A sintered body after the completion of sintering was cooled at the rate shown in Table 1 to prepare each sample.

Evaluation

The magnetic characteristics of each sample were measured at 27° C. using a vibrating sample magnetometer (VSM).

Each sample was observed under a scanning electron microscope (SEM), and the average grain size of the main phase was determined. In addition, the volume fraction of the main phase of each sample was measured by the method described in "<<Rare earth magnet>>". Then, for each sample, the molar ratios between $R^1$, La, and Ce in the main phase and the grain boundary phase were respectively analyzed using a scanning electron microscope/energy dispersive X-ray (SEM-EDX) to calculate (the existence proportion of La in the grain boundary phase)/(the existence proportion of La in the main phase).

Figure 5:
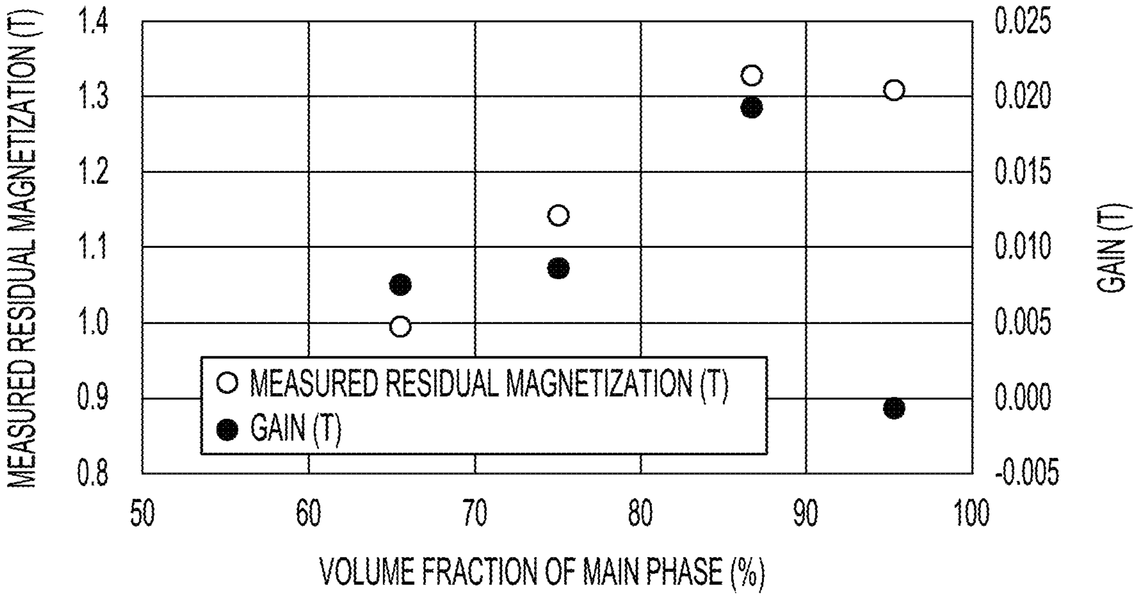
FIG. 5 is a graph showing a relationship between the volume fraction of the main phase, the measured residual magnetization, and the gain, for the samples of Example 2 and Comparative Examples 3 to 5.
Figure 6:
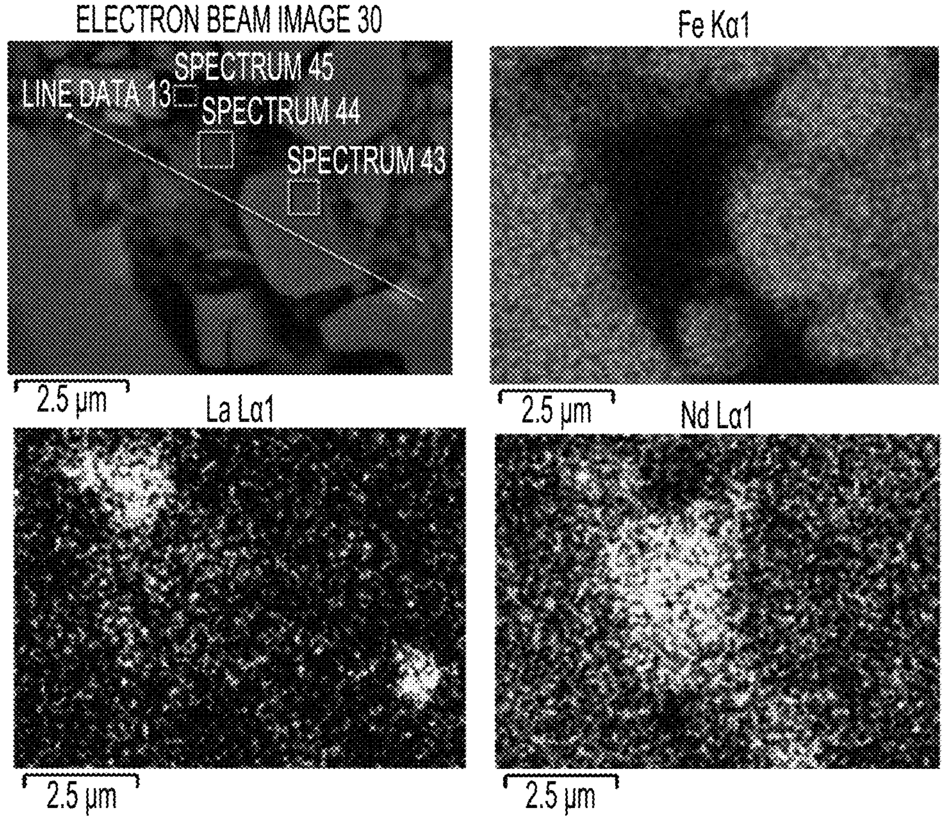
FIG. 6 shows an electron beam image and surface analysis results of La, Nd, and Fe for a sample of Example 2.

The results are shown in Table 1-1 and Table 1-2 as well as FIG. 5 and FIG. 6. In Table 1-1 and Table 1-2, the residual magnetization (the predicted residual magnetization) of each sample, predicted from the overall composition of the rare earth magnet of the present disclosure, is shown together. In addition, in Table 1, the difference between the predicted residual magnetization and the measured residual magnetization, that is, the gain is shown together for each sample. In FIG. 5, the relationship between the volume fraction of the main phase, the measured residual magnetization, and the gain, is shown for the samples of Example 2 and Comparative Examples 3 to 5. In FIG. 6, the electron beam image and the surface analysis results for La, Nd, and Fe are shown for the sample of Example 2.

TABLE 1-1

| | Overall composition | | | | | Cooling of | |
|---|---|---|---|---|---|---|---|
| | Composition formula (molar ratio) | La molar ratio x | Co molar ratio y | x + y | y/(x + y) | molten metal | Pulverization method |
| Comparative Example 1 | $Nd_{11}Pr_3Fe_{bal}Co_{1.1}B_{5.3}Ga_{0.55}Cu_{0.16}Al_{0.85}$ | 0 | 0 | 0.000 | 0 | Arc method | Cutter mill |
| Example 1 | $Nd_{10.5}La_{0.7}Pr_{2.8}Fe_{bal}Co_{1.1}B_{5.3}Ga_{0.55}Cu_{0.16}Al_{0.85}$ | 0.050 | 0 | 0.050 | 0 | Arc method | Cutter mill |
| Example 2 | $Nd_{9.9}La_{1.45}Pr_{2.7}Fe_{bal}Co_{1.1}B_{5.3}Ga_{0.55}Cu_{0.16}Al_{0.85}$ | 0.100 | 0 | 0.100 | 0 | Arc method | Cutter mill |
| Example 3 | $Nd_{9.4}La_{2.1}Pr_{2.5}Fe_{bal}Co_{1.1}B_{5.3}Ga_{0.55}Cu_{0.16}Al_{0.85}$ | 0.150 | 0 | 0.150 | 0 | Arc method | Cutter mill |
| Example 4 | $Nd_{8.3}La_{3.5}Pr_{2.2}Fe_{bal}Co_{1.1}B_{5.3}Ga_{0.55}Cu_{0.16}Al_{0.85}$ | 0.250 | 0 | 0.250 | 0 | Arc method | Cutter mill |
| Comparative Example 2 | $Nd_{5.5}La_7Pr_{1.5}Fe_{bal}Co_{1.1}B_{5.3}Ga_{0.55}Cu_{0.16}Al_{0.85}$ | 0.500 | 0 | 0.500 | 0 | Arc method | Cutter mill |
| Comparative Example 3 | $Nd_{12.2}La_{1.3}Fe_{bal}B_{5.8}Ga_{0.3}Cu_{0.1}Al_{0.2}$ | 0.100 | 0 | 0.100 | 0 | Arc method | Hydrogen-embrittlement and pulveriztion → jet mill |
| Comparative Example 4 | $Nd_{23.5}La_{2.7}Fe_{bal}B_{6.3}Ga_{0.3}Cu_{0.1}Al_{0.2}$ | 0.100 | 0 | 0.100 | 0 | Arc method | Hydrogen-embrittlement and pulveriztion → jet mill |
| Comparative Example 5 | $Nd_{19.1}La_{2.1}Fe_{bal}B_6Ga_{0.3}Cu_{0.1}Al_{0.2}$ | 0.100 | 0 | 0.100 | 0 | Arc method | Hydrogen-embrittlement and pulveriztion → jet mill |
| Example 5 | $Nd_{9.9}La_{0.7}Ce_{0.7}Pr_{2.7}Fe_{bal}Co_{1.1}B_{5.3}Ga_{0.35}Cu_{0.16}Al_{0.85}$ | 0.050 | 0.050 | 0.100 | 0.50 | Arc method | Cutter mill |
| Comparative Example 6 | $Nd_{9.9}La_{0.3}Ce_{0.11}Pr_{2.7}Fe_{bal}Co1.1B_{5.3}Ga_{0.55}Cu_{0.16}Al_{0.85}$ | 0.025 | 0.075 | 0.100 | 0.75 | Arc method | Cutter mill |

TABLE 1-2

| | Sintering temperature (° C.) | Sintering time (h) | Cooling rater after sinering (° C./min) | Main phase Grain size $D_{50}$ (μm) | Main phase Volume fraction (%) | Main phase molar ratio $R^1$ | Main phase molar ratio La | Grain boundary phase molar ratio $R^1$ | Grain boundary phase molar ratio La |
|---|---|---|---|---|---|---|---|---|---|
| Comparative Example 1 | 1,050 | 4 | 1 | 8.0 | 86.6 | 1 | 0 | 1 | 0 |
| Example 1 | 1,050 | 4 | 1 | 7.7 | 86.6 | 0.97 | 0.03 | 0.93 | 0.07 |
| Example 2 | 1,050 | 4 | 1 | 6.2 | 86.6 | 0.92 | 0.08 | 0.86 | 0.14 |
| Example 3 | 1,050 | 4 | 1 | 5.5 | 86.6 | 0.88 | 0.12 | 0.79 | 0.21 |
| Example 4 | 1,050 | 4 | 1 | 6.1 | 86.6 | 0.80 | 0.20 | 0.68 | 0.32 |
| Comparative Example 2 | 1,050 | 4 | 1 | 6.4 | 86.6 | 0.59 | 0.41 | 0.45 | 0.55 |
| Comparative Example 3 | 1,050 | 4 | 1 | 4.2 | 95.2 | 0.90 | 0.10 | 0.89 | 0.11 |
| Comparative Example 4 | 1,050 | 4 | 1 | 4.0 | 65.4 | 0.95 | 0.05 | 0.86 | 0.14 |
| Comparative Example 5 | 1,050 | 4 | 1 | 4.4 | 75.0 | 0.94 | 0.06 | 0.85 | 0.15 |
| Example 5 | 1,050 | 4 | 1 | 6.1 | 86.6 | 0.93 | 0.03 | 0.94 | 0.06 |
| Comparative Example 6 | 1,050 | 4 | 1 | 7.2 | 86.6 | 0.93 | 0.02 | 0.97 | 0.03 |

| | (Existence proportion of La in grain boundary phase)/(existence proportion of La in main phase) | Predicted residual magnetization (T) | Measured residual magnetization (T) | Gain (T) | Coercive force (kA/m) |
|---|---|---|---|---|---|
| Comparative Example 1 | 0 | 1.333 | 1.333 | 0.000 | 167.1 |
| Example 1 | 2.03 | 1.322 | 1.330 | 0.008 | 175.1 |
| Example 2 | 1.82 | 1.311 | 1.330 | 0.019 | 183.0 |
| Example 3 | 1.75 | 1.299 | 1.320 | 0.021 | 175.1 |
| Example 4 | 1.56 | 1.277 | 1.290 | 0.013 | 135.3 |
| Comparative Example 2 | 1.33 | 1.220 | 1.240 | 0.020 | 87.5 |
| Comparative Example 3 | 1.11 | 1.311 | 1.310 | −0.001 | 509.3 |
| Comparative Example 4 | 2.76 | 0.989 | 0.997 | 0.008 | 962.9 |
| Comparative Example 5 | 2.60 | 1.135 | 1.143 | 0.009 | 763.9 |
| Example 5 | 1.79 | 1.284 | 1.300 | 0.016 | 151.2 |
| Comparative Example 6 | 1.67 | 1.225 | 1.260 | 0.035 | 135.3 |

From Table 1-1 and Table 1-2, it can be understood that in all of the samples of Examples, the volume fraction of the main phase is within the predetermined range, and the following is satisfied, (the existence proportion of La in the grain boundary phase)/(the existence proportion of La in the main phase)>1.30. Then, from FIG. 5 in addition to Table 1-1 and Table 1-2, it can be understood that in all of the samples of Examples, not only the gain is 0.003 T or more, but also the measured residual magnetization is 1.26 T or more, and the decrease in residual magnetization can be suppressed as much as possible as compared with the residual magnetization 1.333 T of the sample of Comparative Example 1, in which a part of $R^1$'s (Nd and Pr) are not substituted with a light rare earth element. Further, from FIG. 6, it can be understood that in the sample of Example 2, the existence proportion of La is higher in the grain boundary phase than in the main phase.

From the above results, the effects of the rare earth magnet and the manufacturing method therefor of the present disclosure could be confirmed.

What is claimed is:

1. A rare earth magnet comprising:

a main phase; and a grain boundary phase present around the main phase, wherein:

an overall composition in terms of a molar ratio is represented by a formula $(R^1_{(1-x-y)}La_xCe_y)_u(Fe_{(1-z)}Co_z)_{(100-u-w-v)}B_wM^1_v$, where $R^1$ is one or more elements selected from the group consisting of Nd, Pr, Gd, Tb, Dy, and Ho; $M^1$ is one or more elements selected from the group consisting of Ga, Al, Cu, Au, Ag, Zn, In, and Mn, and an unavoidable impurity element; and the followings are satisfied, $$0.05 \le x \le 0.20,$$

$$0 \le y/(x+y) \le 0.50,$$

$$13.5 \le u \le 20.0,$$

$$0 \le z \le 0.100,$$

$$5.0 \le w \le 10.0, \text{ and}$$

$$0 \le v \le 2.00;$$

the main phase has an $R_2Fe_{14}B$ crystal structure, where R is a rare earth element;

an average grain size of the main phase is 6.0 μm to 8.0 μm;

a volume fraction of the main phase is 80.0% to 86.6%; and the main phase and the grain boundary phase satisfy the following, 1.30<(an La proportion in the grain boundary phase)/(an La proportion in the main phase)≤3.00.

2. The rare earth magnet according to claim 1, wherein:

the R1 is one or more elements selected from the group consisting of Nd and Pr; and the M1 is one or more elements selected from the group consisting of Ga, Al, and Cu, and an unavoidable impurity element.

3. The rare earth magnet according to claim 1, wherein the main phase and the grain boundary phase satisfy the following, (the La proportion in the grain boundary phase)/(the La proportion in the main phase)≥1.56.

4. A manufacturing method for the rare earth magnet according to claim 1, the manufacturing method comprising:

preparing a molten metal having a composition, in terms of a molar ratio, represented by a formula $(R^1_{(1-x-y)}La_xCe_y)_u(Fe_{(1-z)}Co_z)_{(100-u-w-v)}B_wM^1_v$ (where $R^1$ is one or more elements selected from the group consisting of Nd, Pr, Gd, Tb, Dy, and Ho; $M^1$ is one or more elements selected from the group consisting of Ga, Al, Cu, Au, Ag, Zn, In, and Mn, and an unavoidable impurity element; and the followings are satisfied, $$0.05 \le x \le 0.20,$$

$$0 \le y/(x+y) \le 0.50,$$

$$13.5 \le u \le 20.0,$$

$$0 \le z \le 0.100,$$

$$5.0 \le w \le 10.0, \text{ and}$$

$$0 \le v \le 2.00);$$

cooling the molten metal at a rate of 1° C./sec to $10^4$° C./sec to obtain a magnetic alloy;

pulverizing the magnetic alloy to obtain a magnetic powder; and sintering the magnetic powder without pressurization to obtain a sintered body.

5. The manufacturing method according to claim 4, wherein the magnetic powder is sintered without pressurization at 900° C. to 1,100° C.

6. The manufacturing method according to claim 4, wherein the sintered body after the sintering without pressurization is cooled at a rate of 1° C./min or less.

7. The manufacturing method according to claim 4, wherein:

the $R^1$ is one or more elements selected from the group consisting of Nd and Pr; and the $M^1$ is one or more elements selected from the group consisting of Ga, Al, and Cu, and an unavoidable impurity element.

* * * * *